(12) United States Patent
Bert et al.

(10) Patent No.: US 9,992,462 B2
(45) Date of Patent: Jun. 5, 2018

(54) MULTI-SCREEN PROJECTOR SETTING

(71) Applicant: Barco N.V., Kortrijk (BE)

(72) Inventors: Tom Bert, Lochristi (BE); Bart Maximus, Oudenaarde (BE); Claude Daniel Tydtgat, Ledegem (BE)

(73) Assignee: BARCO N.V., Kortrijk (BE)

( * ) Notice: Subject to any disclaimer, the term of this patent is extended or adjusted under 35 U.S.C. 154(b) by 0 days. days.

(21) Appl. No.: 14/984,068

(22) Filed: Dec. 30, 2015

(65) Prior Publication Data

US 2016/0112691 A1 Apr. 21, 2016

Related U.S. Application Data

(63) Continuation of application No. 14/901,915, filed as application No. PCT/EP2014/069429 on Sep. 11, 2014.

(30) Foreign Application Priority Data

Sep. 11, 2013 (GB) .................................. 1316140.1
Feb. 20, 2014 (GB) .................................. 1403022.5

(51) Int. Cl.
*G03B 21/60* (2014.01)
*H04N 9/31* (2006.01)
(Continued)

(52) U.S. Cl.
CPC ............ *H04N 9/3147* (2013.01); *A63J 25/00* (2013.01); *E04H 3/22* (2013.01); *G03B 21/60* (2013.01); *G03B 21/602* (2013.01)

(58) Field of Classification Search
CPC ......... A63J 25/00; E04H 3/22; H04N 9/3147; G03B 21/56; G03B 21/60; G03B 21/62; G03B 21/625
(Continued)

(56) References Cited

U.S. PATENT DOCUMENTS 3,237,517 A 3/1966 Komitor
3,628,829 A 12/1971 Heilig
(Continued)

FOREIGN PATENT DOCUMENTS

CN 1523439 A 8/2004
CN 1926497 A 3/2007
(Continued)

OTHER PUBLICATIONS

Annex to Form PCT/ISA/206 Communication Relating to the Results of the Partial International Search for corresponding Patent Application No. PCT/EP2014/069429 dated Jan. 12, 2015.
(Continued)

*Primary Examiner* — William C Dowling
(74) *Attorney, Agent, or Firm* — Renner, Otto, Boisselle & Sklar, LLP

(57) ABSTRACT

A projection assembly comprising at least a first screen (14) and a second screen (10). The first screen (14) is at an angle with the second screen (10). The first screen (14) is adapted to reflect light projected onto it predominantly or exclusively in one or more angular ranges that do not intersect with the second screen (10). The invention also pertains to a method for projecting images with such a projection assembly, comprising projecting a first image with the first projector (16B) on the first screen (14), and projecting a second image with the second projector (16A) on the second screen (10).

17 Claims, 13 Drawing Sheets

(51) Int. Cl.
*G03B 21/602* (2014.01)
*A63J 25/00* (2009.01)
*E04H 3/22* (2006.01)

(58) Field of Classification Search
USPC .......................................... 353/94; 359/449
See application file for complete search history.

(56) References Cited

U.S. PATENT DOCUMENTS

| | | | |
|---|---|---|---|
| 5,963,247 | A | 10/1999 | Banitt |
| 5,964,064 | A | 10/1999 | Goddard et al. |
| 6,650,396 | B2 | 11/2003 | Li |
| 6,909,543 | B2 | 6/2005 | Lantz |
| 7,221,506 | B1 | 5/2007 | Schlosser |
| 7,548,369 | B2 | 6/2009 | Poulsen |
| 8,149,508 | B2 | 4/2012 | Ferren et al. |
| 9,436,076 | B2 * | 9/2016 | Kim .......................... E04H 3/22 |
| 9,772,549 | B2 * | 9/2017 | Candry .................. G03B 37/04 |
| 2002/0001064 | A1 | 1/2002 | Graves et al. |
| 2008/0074740 | A1 | 3/2008 | Wood |
| 2010/0253917 | A1 | 10/2010 | Gao et al. |
| 2011/0157694 | A1 | 6/2011 | Ferren et al. |
| 2014/0016041 | A1 * | 1/2014 | Kim ........................ G03B 21/53 348/745 |
| 2014/0204343 | A1 * | 7/2014 | Choi .......................... E04H 3/22 353/10 |
| 2014/0320828 | A1 * | 10/2014 | Kim .......................... E04H 3/22 353/94 |
| 2014/0340647 | A1 * | 11/2014 | Kim .......................... E04H 3/22 352/40 |
| 2014/0354954 | A1 * | 12/2014 | Kim .......................... E04H 3/22 352/10 |
| 2016/0080710 | A1 * | 3/2016 | Hattingh .............. H04N 9/3185 348/52 |
| 2016/0139499 | A1 * | 5/2016 | Kim ........................ G03B 21/60 352/70 |
| 2016/0165196 | A1 * | 6/2016 | Gocke ................. G03B 21/562 352/43 |
| 2016/0373706 | A1 * | 12/2016 | Bert .......................... E04H 3/22 |

FOREIGN PATENT DOCUMENTS

| | | |
|---|---|---|
| CN | 101426993 A | 5/2009 |
| CN | 102608858 A | 7/2012 |
| EP | 2 685 313 A1 | 1/2014 |
| JP | 2002341437 A | 11/2002 |
| JP | 3914728 B2 | 5/2007 |
| JP | 2007 180979 A | 7/2007 |
| JP | 2008 175 960 A | 7/2008 |
| JP | 2011 013522 A | 1/2011 |
| JP | 2011 254268 A | 12/2011 |
| JP | 2013 083737 A | 5/2013 |
| KR | 10-1305252 | 9/2013 |
| KR | 101305249 B1 | 9/2013 |
| WO | 2005/017739 A1 | 2/2005 |
| WO | 2012/160658 A1 | 11/2012 |
| WO | 2013/005857 A1 | 1/2013 |

OTHER PUBLICATIONS

International Search Report and Written Opinion for corresponding Patent Application No. PCT/EP2014/069429 dated Apr. 15, 2015.
Second Written Opinion for corresponding Patent Application No. PCT/EP2014/069429 dated Aug. 26, 2015.
International Preliminary Report on Patentability for corresponding Patent Application No. PCT/EP2014/069429 dated Dec. 7, 2015.
Search Report for corresponding Patent Application No. GB1316140.1 dated Mar. 6, 2014.
Search Report for corresponding Patent Application No. GB1403022.5 dated Mar. 6, 2014.
Office Action for corresponding U.S. Appl. No. 14/901,915 dated May 18, 2017.
Examination Report under Section 18(3) for GB1403022.5, issued on Jun. 1, 2017.
Examination Report for corresponding European Patent Application No. 14777540.7 dated Oct. 11, 2017.
Office Action for corresponding Chinese Patent Application No. 201480038197.6 dated Jun. 16, 2017.

* cited by examiner

MULTI-SCREEN PROJECTOR SETTING

RELATED APPLICATIONS

This application is a continuation of U.S. application Ser. No. 14/901,915 filed Dec. 29, 2015, which is a national phase of International Application No. PCT/EP2014/069429 filed Sep. 11, 2014 and published in the English language, which claims priority to GB 1316140.1 filed Sep. 11, 2013 and GB 1403022.5 filed Feb. 20, 2014, which are all hereby incorporated herein by reference.

FIELD OF THE INVENTION

The present application relates to projection assemblies having a plurality of screens suitable for viewing a projected image, and optionally one or more projectors appropriately arranged to project a projected image onto these screens as well as to method of constructing and operating such assemblies, controllers and software for such assemblies.

BACKGROUND OF THE INVENTION

In U.S. Pat. No. 5,964,064 "Theater with multiple screen three dimensional film projection system" a theater is disclosed including an audience seating area, a stage and at least three projection screens. Right and left projection screens are positioned at an angle to the center projection screen. Multiple film projectors simultaneously project a three dimensional film onto the three projection screens. Three dimensional film elements appear to move seamlessly from one projection screen to the next. In a live action show, actors, stage sets and show action equipment appear to interact with the three dimensional film. The filmed set blends with the stage sets to give dimension and a feeling of depth to the viewing audience. The audience cannot easily distinguish between the real elements and filmed elements thereby intensifying the theater experience.

In the proposed settings, the light reflected by e.g. the left screen will reach not only the audience but also the center screen and the right screen. The same holds mutatis mutandis for the light reflected by the center screen and the right screen. This usually causes visual artefacts that will impact the viewer experience negatively.

A similar problem exists for images projected on dome shaped screen where images can be projected by two or more projectors. In U.S. Pat. No. 6,909,543 "Foveated Display System", an improved theater geometry is disclosed which is capable of providing improved image resolution and improved image contrast over prior systems. This is achieved with a unique projection geometry and image re-mapping technique. The projected image is provided with a continuously variable image resolution and brightness over the surface of a preferably dome-shaped screen which is to receive the image, concentrating the resolution and the brightness of the image within the central field-of-view of viewers that are unidirectionally seated in the theater, and sacrificing resolution and brightness toward the outside edges of the viewers' field-of-view. The result is a more efficient use of available projector resolution and brightness, an increase in the number of quality seats available in the theater, and an enhanced image contrast due to reductions in the light which is scattering from image elements on the sides and to the rear of the screen.

If applied to a theater as described in U.S. Pat. No. 5,964,064, contrast and resolution would be highest on the central screen and would decrease on the lateral screens. The attention of the spectators being drawn from one screen to another as three-dimensional film elements appear to move seamlessly from one projection screen to the next, the central field of view of viewers can move rapidly from one screen to another. Without adaptation, the method proposed in U.S. Pat. No. 6,909,543 will lead to situations where the spectators will experience variation in brightness not linked to the content of the images being projected, but to the screen on which they are projected.

U.S. Pat. No. 8,149,508 "System for providing an enhanced immersive display environment" discloses an immersive dome including a number of novel features designed to enhance the performance of the immersive dome over other immersive dome environments. Projectors are mounted in a multi-tier tower, out of sight beneath a viewing platform positioned to provide optimal wrap-around viewing. The projection surface consists of open-cell foam that allows passage of behind-surface sound into the dome while allowing unwanted ambient noise within the dome to escape. A visually-reflective coating, in conjunction with the open cell structure, provides a textured surface that acts as a micro-baffle and suppresses cross-reflection of projected imagery. The surface of the screens is structured with a plurality of cavities defining vertical walls that extend into the screen from the projection surface; wherein said plurality of cavities terminate before extending through the screen, and wherein the plurality of cavities form micro-baffles; and wherein light at near normal incidence is reflected and wherein light at oblique angles of incidence is trapped and absorbed by said cavities for suppressing visible cross-reflectance. Projection having to be done perpendicularly to a screen, the proposed solution cannot be transposed to theater settings where one or more projectors cannot be placed so as to project perpendicularly to a screen without loss of luminosity and creating visual artefacts.

As was the case with the other solutions described, the solution described in U.S. Pat. No. 8,149,508 will not be effective when the spectators are spread over a large area and away from a central position or "sweet spot".

Similar problems exists with the solution proposed in U.S. Pat. No. 7,548,369 "Projection-receiving surface comprising a single sheet formed into a plurality of catenoid-like mirrorlettes", where the sweet spot is along a perpendicular to each screen element. The field of view can be tuned but is always centered on the normal to the screen elements. Therefore, the problem is not solved: increasing the field of view is possible by decreasing the cut-off rate of the screens but then the contrast of the image projected on one screen element is reduced by the light reflected on other screen elements. Furthermore, the optical axis of the projector has to be aligned with the normal to the screen which imposes restrictions to the position that the projectors can take relatively to the screen on which they project.

In the system disclosed in U.S. Pat. No. 7,221,506, entitled "Method and system for projecting audio and video in an outdoor theater", images are projected onto two adjacent screens whereby one screen is movable with respect to the second screen. A projection system disposed generally in front of the two screens is capable of displaying images on each screen independently when the two screens are in an "open" position or on both screens together when the two screens are configured in a "closed" position. In a first "open" configuration, the images viewable on one screen are not viewable to the viewers of images on an adjacent screen and, in a second "closed" configuration, images are displayed on both screens together (forming a single, planar viewing surface) so as to be viewable by all members of the audience. In addition, a berm is configured between the viewing area of one screen and the viewing area of the other screen to create an audio and visual barrier between the two screens.

In the arrangement disclosed in JP 2008-175960, mirrors are installed between the projection devices and screens so that distances from the projection devices to the screens may be the same as distances from the observer seat to the screens, with a view to providing projection video with which a feeling of presence is obtained without a sense of incongruity as seen from an observer seat.

SUMMARY OF THE INVENTION

According to an aspect of the present invention, there is provided a projection assembly comprising at least a first screen and a second screen; wherein the first screen is at an angle with the second screen; and wherein the first screen is adapted to reflect light projected onto it predominantly or exclusively in one or more angular ranges that do not intersect with the second screen.

The term "projection assembly" as used herein refers to a plurality of screens suitable for viewing a projected image, and optionally one or more projectors appropriately arranged to project a projected image onto these screens. The "projection assembly" may also be referred to as a "projection setting" or a "theater setting".

The term "predominantly" is used herein to denote that a large part of the reflected light is situated in angular ranges that do not intersect with the second screen. This large part is preferably at least 80% of the reflected light energy, more preferably at least 90% of the reflected light energy, even more preferably at least 95% of the reflected light energy, and most preferably at least 99% of the reflected light energy.

The term "at an angle" is used to indicate that the first screen and the second screen are not coplanar or parallel. In particular, it is used to indicate that the inner angle formed by the first screen and the second screen, on the side where a viewer is intended to be located, is less than 180°. In this geometry, light projected onto the first screen and reflected omnidirectionally by said first screen would reach the second screen, where it would result in a visual artifact. The present invention aims to avoid that phenomenon. The inner angle formed by the first screen and the second screen may, for example, be between 90° (e.g., following a corner of a rectangular viewing area) and 135° (e.g., forming a first half of the transition in a corner of a rectangular viewing area, another screen at the same angle being required to complete the corner).

The described directionally selective light reflection by the first screen occurs when light is projected onto the first screen from the projection direction corresponding to the desired theater setup. Optionally, the described directionally selective light reflection by the first screen occurs regardless of the angle of incidence of the light impinging on the first screen.

It is an advantage of the projection assembly according to the present invention that incident light arriving on the first screen will not be reflected onto the second screen, such that interference between the image on the first screen and the image on the second screen can be avoided. Preferably, the non-interference relationship between the screens is reciprocal, such that the second screen exhibits the same property towards the first screen.

In an embodiment of the projection assembly according to the present invention, the first screen is a lenticular screen.

Lenticular screens can be manufactured in an economical way, and advantageously provide the desired limitation of the angular range of reflection.

In an embodiment of the projection assembly according to the present invention, the thickness of the first screen is not constant in at least one direction across the screen.

By modulating the thickness of the screen, the screen will present partial surfaces having different orientations. These partial surfaces will reflect incident light according to their respective orientations. Partial surfaces that have an orientation so as to reflect incident light towards the audience may be given better reflectivity properties (e.g., white coating) relative to partial surfaces that have an orientation so as to reflect incident light towards the second screen (which may for example be given a black coating). The amplitude of the thickness variations may vary according to the application between a few tenths of millimeters to a few centimeters.

In an embodiment of the projection assembly according to the present invention, the thickness of the first screen varies in a sawtooth fashion in at least one direction across the screen.

It is an advantage of this embodiment that this is a geometrically simple way to provide the partial surfaces discussed above, as the sawtooth naturally has two sets of sections having different respective orientations.

In an embodiment of the projection assembly according to the present invention, a first plurality of sections of said sawtooth pattern are rotated away from said second screen over an angle between 5° and 30°.

As will be explained in more detail below, the inventors have found that, surprisingly, a rotation angle of up to 30° reduces the reflection towards the second screen significantly without substantially impacting the brightness of the image as seen by the audience.

In an embodiment of the projection assembly according to the present invention, a second plurality of sections of said sawtooth pattern are rotated towards said second screen, said second plurality of sections having a surface with reduced reflectivity.

The "back sections" of the sawtooth pattern may be painted black, or otherwise given low reflectivity properties.

In an embodiment of the projection assembly according to the present invention, the thickness of the first screen varies periodically.

In an embodiment, the projection assembly according to the present invention further comprises a third screen arranged at an angle with the second screen. In a particular embodiment, the second screen is between the first and third screens.

In an embodiment, the projection assembly according to the present invention further comprises a first projector arranged to project first images on the first screen and a second projector arranged to project second images on the second screen.

In a specific embodiment, the projection assembly further comprises control means configured to control the first projector in such a way that the brightness of the image projected on the first screen is a function of the brightness of the image projected on the second screen.

In a specific embodiment, the projection assembly further comprises control means configured to control the first projector in such a way that the brightness of at least a part of the image projected on the first screen is a function of the brightness of at least a part of the image projected on the second screen.

In a specific embodiment, the projection assembly further comprises control means configured to control the first projector in such a way that the brightness of at least one pixel of the image projected on the first screen is a function of the brightness of at least one pixel of the image projected on the second screen.

In a specific embodiment, the projection assembly further comprises control means configured to control the first projector in such a way that the brightness of at least one pixel of the image projected on the first screen is a function of the brightness of a cluster of pixels of the image projected on the second screen, the cluster of pixels having fewer pixels than the number of pixels projected on the second screen.

It is an advantage of this embodiment that the required amount of computational power is decreased.

In a specific embodiment, the projection assembly further comprises control means configured to control the first projector in such a way that the brightness of at least one cluster of pixels of the image projected on the first screen is a function of the brightness of a cluster of pixels of the image projected on the second screen, the cluster of pixels on the first screen having fewer pixels than the cluster of pixels projected on the second screen.

This embodiment will further decrease the required amount of computations and complexity of the function to be evaluated to take the brightness of images on the second screen into account.

According to an aspect of the present invention, there is provided a method for projecting images with a projection assembly, the method comprising projecting a first image with the first projector on the first screen, and projecting a second image with the second projector on the second screen. The projection assembly may be an assembly according to an embodiment of the first aspect of the present invention, as described above, whereby the first screen reflects light projected onto it by the first projector predominantly or exclusively in one or more angular ranges that do not intersect with the second screen. The method may further include setting a first screen at an angle with a second screen so that the first screen reflects light projected onto it by the first projector predominantly or exclusively in one or more angular ranges that do not intersect with the second screen.

In an embodiment, the method according to the present invention further comprises adjusting the brightness of the first image in function of the brightness of the second image.

In an embodiment, the method according to the present invention further comprises adjusting the brightness of at least a part of the first image in function of the brightness of at least a part of the second image.

In an embodiment, the method according to the present invention further comprises adjusting the brightness of at least one pixel of the first image in function of the brightness of at least one pixel of the second image.

In an embodiment, the method according to the present invention further comprises adjusting the brightness of at least one pixel of the first image in function of the brightness of a cluster of pixels of the second image, the cluster of pixels having fewer pixels than the number of pixels in the second image.

In an embodiment, the method according to the present invention further comprises adjusting the brightness of at least one cluster of pixels of the first image in function of the brightness of a cluster of pixels of the second image, the cluster of pixels of the first image having fewer pixels than the number of pixels in the first image.

According to an aspect of the present invention, there is provided a controller configured for use as the control means of embodiments of the projection assembly according to the present invention and/or to perform the adjusting of embodiments of the method according to the present invention.

According to an aspect of the present invention, there is provided a computer program product comprising code means configured to cause a processor to carry out the function of the control means of embodiments of the projection assembly according to the present invention and/or to perform the adjusting of embodiments of the method according to the present invention.

The technical effects and advantages of the embodiments of the method, the controller, and the computer program product according to the invention correspond mutatis mutandis to those of the corresponding embodiments of the projection assembly according to the invention.

BRIEF DESCRIPTION OF THE FIGURES

These and other features and advantages of embodiments of the present invention will now be described in more detail with reference to the accompanying drawings, in which.

DETAILED DESCRIPTION OF EMBODIMENTS

Figure 1:
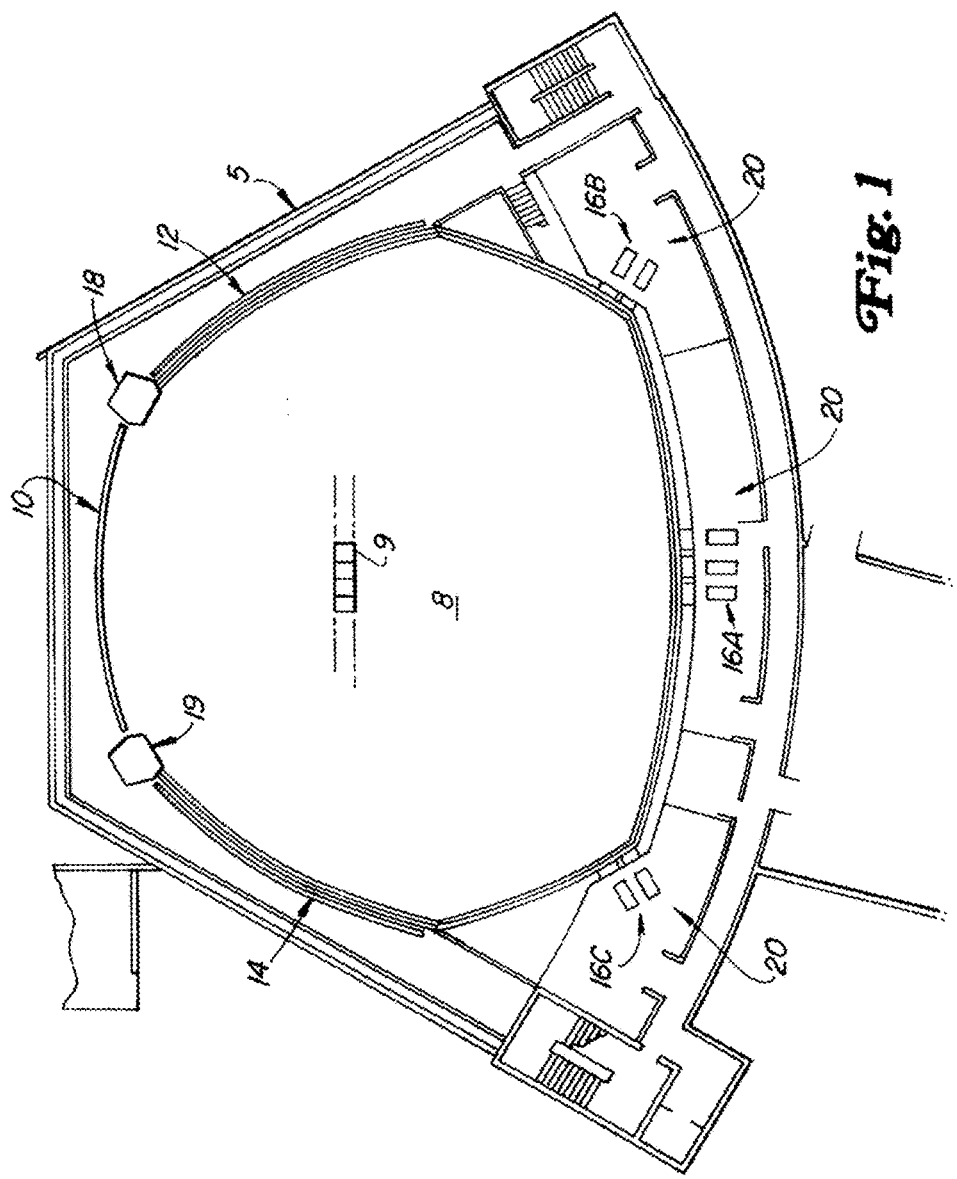
FIG. 1 illustrates a projection assembly according to an embodiment of the present invention.

A first embodiment of projector settings considered in this invention is as shown on FIG. 1. A theater 5 which has screens facing an audience seating area 8 having seats 9, a center projection screen 10, a right projection screen 12, and a left projection screen 14. The right and left projection screens (12, 14) are positioned at an angle to the center projection screen 10. In a typical setup, the angles between each of the side screens 12, 14 and the center projection screen 10 are approximately 90°, such that the projection zone can follow the contours of one side of a substantially rectangular theater. Some of the seats can be surrounded by the screens on three sides. The projection screens can be flat or concave. Preferably, the screens are flat.

The screens can be jointed or not (i.e. with a gap between screens from a few millimeters to several meters or more). The gap between screens can be filled with one or more objects (e.g. columns or pillars 18 and 19) or empty.

In the back of the theater 5 are three projection rooms 20. In each projection room 20 are multiple film projectors 16A, 16B, 16C. As shown on FIG. 1, film projectors 16A project a portion of the film onto the center projection screen 10. Film projectors 16B project another portion of the film onto the left projection screen 14. Film projectors 16C project a third portion of the film onto the right projection screen 12. The projected images from the center projector 16A may abut or even overlap with the projected images from the side projectors 16B and 16C. In this manner, the film is presented to the audience in panorama. The film elements may move seamlessly from one screen to the next, making the film more realistic.

With conventional screens, with diffusion characteristics close to a Lambertian projection screens, some of the light projected by the side projector 16B on the left projection screen 14 will reach the center projection screen 10 (see FIG. 2A) and the right projection screen 12. Similarly, some of the light projected by the side projector 16C on the right projection screen 12 will reach the center projection screen 10 and the left projection screen 14. This will create visual artefacts, i.e. the visual content projected on one of the screen by the corresponding projector will appear to have been modified: the colors and light intensity viewed in the audience on one of the screen will not be those intended; the images can appear blurred and/or washed-out.

The amount of light that is reflected from one of the screens ("primary screen") to another one of the screens ("secondary screen") can be estimated, if certain assumptions are made about the screens. In the following example, the screen surfaces are assumed Lambertian and there are 90° angles between the main screen and each side screen.

The incident light on the primary screen, which can be considered as being equal to the luminous power F of the projector divided by the image surface S, will be reflected in such a way that the luminance is the same from all viewing directions. In the case of reflectivity of the Lambertian type with unity gain, the luminance L can be determined in function of F:

$$L = F/(\pi S)$$

where L is expressed in cd/m², F is expressed in lumen, and S is expressed in m².

For a certain (small) white object with size dS projected on the primary screen, the luminous power $F_m$ in an area dA on the secondary screen, caused by the incidence of reflected light on that secondary screen, is given by:

$$d^2 F_m = \frac{F}{\pi S} \frac{\cos\theta \cos\varphi}{r^2} dS dA$$

where the light is reflected from the primary screen to the secondary screen under an angle θ from the normal of the primary screen, and arrives at the secondary screen under an angle φ from the normal of the secondary screen.

In a set-up with perpendicular screens, if a is the distance from the projected area away from the corner, and b is the distance on the secondary screen away from their intersect corner, you can derive that the illumination on the main screen is proportional to:

$$F_m \propto \frac{ba}{(b^2 + a^2)^2}$$

This means the illumination by the primary screen onto the secondary screen will be at its highest in an area not so far from the corner area. If the secondary screen is also a Lambertian screen, the reflection towards the audience will also be highest in this area close to the corner.

While the reflection of the image projected onto the primary screen towards the secondary screen does not produce a specular image on the latter, it is clear from the above that the main effect of the reflection will occur in a gradually delimited area of the secondary screen.

The most disturbing artefacts happen when there is a large difference in the brightness of images projected on at least two of the screens. If for instance, the image projected on the central screen is mainly dark (e.g. a night sky; see FIG. 2B) and the image projected on one of the lateral screen contains one or more bright areas 21 (e.g. a full moon; see FIG. 2B), the reflection 22 of those bright areas on the central screen will appear as a "ghost" or "glare".

By using a lateral screen 14 that reflects light in one or more favored angular ranges that do not intersect with the center screen 10 or with the right screen 12, the visual artefacts discussed here above are canceled or at the very least reduced.

By using lateral screens 12 and 14 that substantively reflect light projected on them respectively by projectors 16C and 16B in one or more angular ranges that do not intersect with the central screen 10 and the opposite lateral screen (respectively 14 and 12), the present invention allows viewers in the audience to perceive the lateral screens in substantially the same way regardless of their position in the seating area 8, increases the overall efficiency of the projection setting by directing the light reflected by the lateral screens preferentially in the direction of the audience, and reduces or cancels visual artefacts caused by light spill-over from one screen to the other.

The invention solves the problem of a projection setting comprising at least a first screen and a second screen and where the first screen is at an angle with the second screen; by using a first screen that reflects light in one or more angular ranges that do not intersect with the second screen.

The first screen can be a lenticular screen where the geometry of the lenticules is such that hardly any light projected on the first screen will be reflected on the second screen.

More generally, a suitable first screen has a thickness that is not constant in at least one direction across the screen. The thickness variations are at least commensurate with the wavelength of the light projected on the screen. The thickness of the screen can be measured from a reference surface e.g. the back of the projection screen. The surface of reference can be considered as a general surface of the screen, the surface obtained when the surface structure like the lenticules have been smoothed out.

Figure 4:
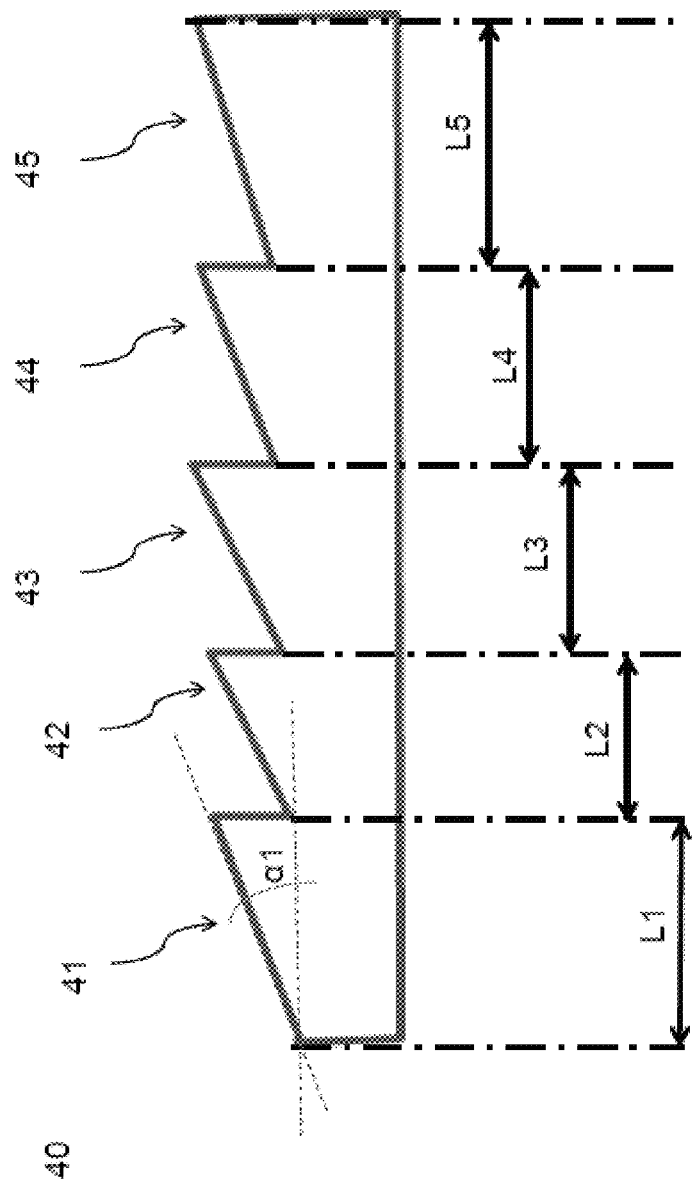
FIG. 4 schematically represents an example of simplified lenticules, formed by thickness variations of a screen.

In particular, the thickness variations give the surface of the first screen a serrated appearance i.e. a section of the screen by a plane perpendicular to the general surface of the screen will look like a jagged, triangular waveform as seen on e.g. FIG. 4.

In particular, the thickness variations of the first screen repeat at regular spatial intervals in at least one direction on the screen. As here above, the periodicity of the thickness variations can be evaluated on a perpendicular section of the screen. The resulting pattern may have the appearance of a sawtooth.

The invention concerns not only projection settings where a single projector projects images on the first and second screen, but also projection settings where a first projector projects images on the first screen and a second projector projects images on the second screen.

More generally, the invention applies to projection settings where M projectors project images on N screens (M and N being natural numbers).

In particular, there may be three screens on which images are projected by one, two or three projectors.

Figure 2A:
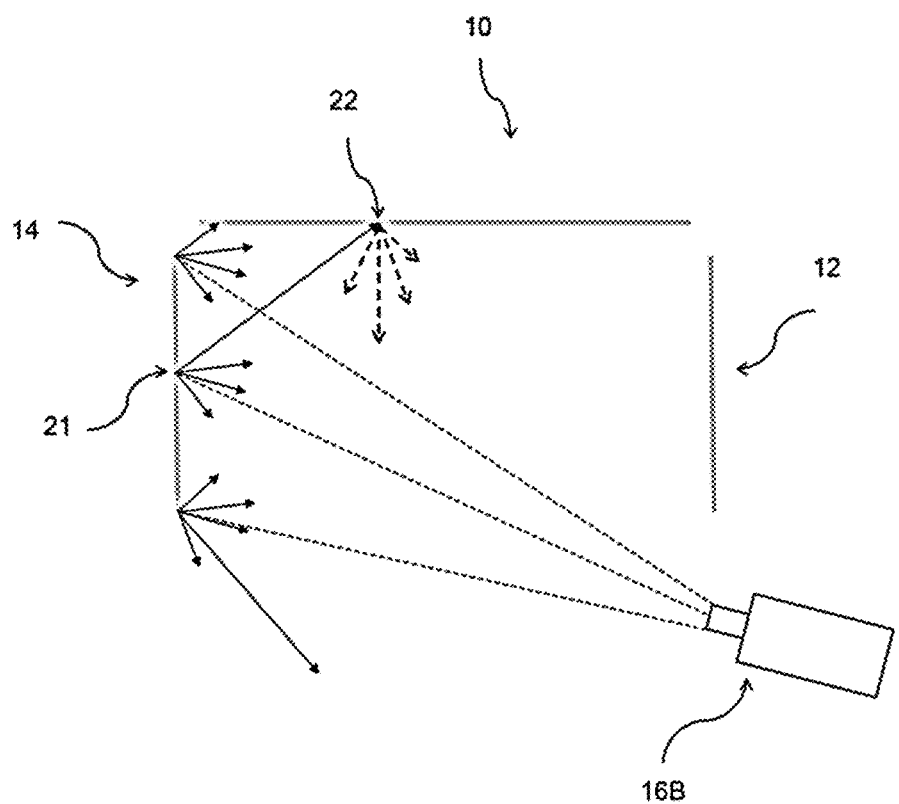
FIG. 2a schematically illustrates the causes of ghost images in a multiple-screen projection setting.

An exemplary embodiment is now described in further detail with reference to FIGS. 1 and 2A. A first projector is positioned in front of the center screen as in commonplace theaters, e.g. at the back of the theater, behind and above the spectators. A second projector is positioned as in FIG. 1 or alternatively in front of the right screen and below (or above) the left screen. A third projector is positioned as in FIG. 1 or alternatively in front of the left screen and below (or above) the right screen. The right and left screens are directional screens. By directional screens we mean screens that will reflect light in preferred light cones or angular ranges, as described above. Those angular ranges may differ substantially from the angular range expected from usual isotropic projection screens.

Figure 3:
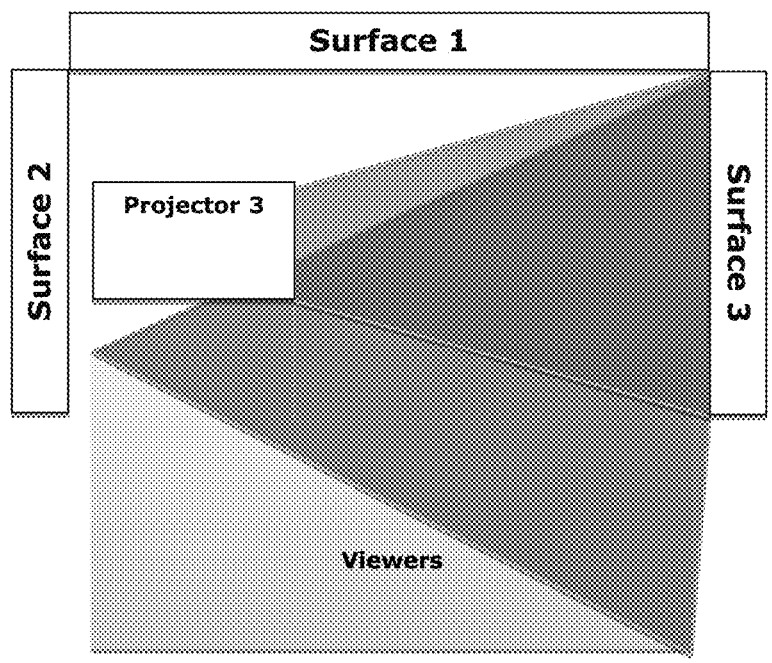
FIG. 3 schematically represents projection and viewing angles in a multi-screen theater setting.

The directional screens can be lenticular screens as described in e.g. U.S. Pat. No. 1,279,262 "Projection screen" and U.S. Pat. No. 4,338,165 "Method of making a high-gain projection screen". The lenticules are designed so as to reflect the light in a favored angular range that excludes the opposite screen (i.e. the right or left screen) and the center screen. That is accomplished by forming the lenticules with an abnormally small vertical or horizontal curvature within the angular range to be favored. That reduced curvature automatically increases the linear dimension of the lenticule portion that corresponds to each angular increment of the beam. An increased proportion of the available light is thereby concentrated into the favored beam sector. The lenticule curvature is then progressively increased, typically throughout the remainder of the lenticule surface, at a rate sufficient to spread the reflected beam over the entire viewing area. The overall result is represented on FIG. 3 for the left screen only. In a second preferred embodiment, the center screen is a lenticular screen with a favored angular range excluding at least part of the left and right screens.

Figure 2B:
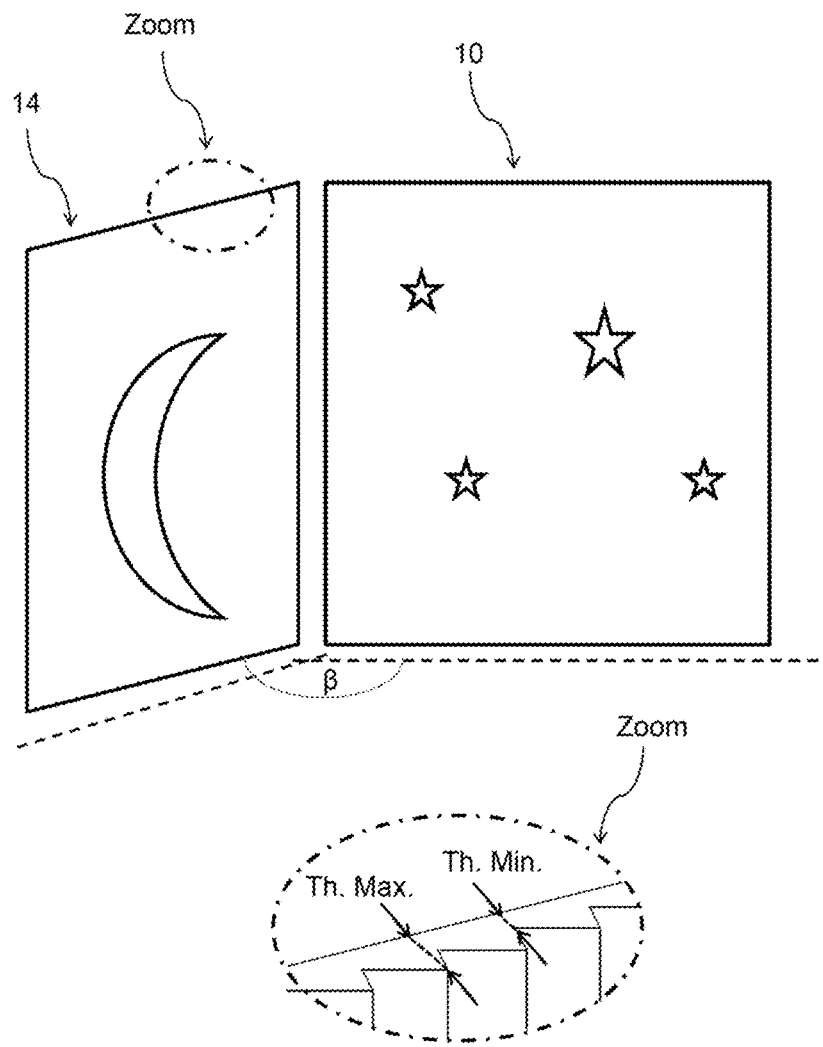
FIG. 2b illustrates an exemplary scenery that could be sensitive to generating artefacts in a multiple-screen projection setting.

In some cases it may be desirable to simplify the shape and the manufacturing of the lenticules. In general, the simplified lenticules are obtained by varying the thickness of the projection screen. As seen on FIG. 2B, a suitable first screen may have a thickness that is not constant in at least one direction across the screen. The zoomed-in cartouche on FIG. 2B shows a perpendicular cross section of the left screen 14. The plane of the section is in this case a horizontal plane and the screens are substantially vertical. The thickness variations are at least commensurate with the wavelength of the light projected on the screen. The thickness of the screen can be measured from a reference surface e.g. the back of the projection screen. The surface of reference can be considered as a general surface of the screen or in other words the surface obtained when the surface structure like the lenticules have been smoothed out.

A first example of simplified lenticules is represented on FIG. 4. FIG. 4 shows a section of a portion of screen 40. Screens being usually held vertically, the section is in a plane perpendicular to the local vertical. The lenticules appear as serrations on the screen. The serrations are on the side of the screen on which a projector projects light. The lenticules 41, 42, 43, 44 and 45 are plane and at an angle with the plane 46 of the screen 40. The size of a lenticule and/or the angle it makes with the plane of the screen may vary from lenticule to lenticule. For instance, on FIG. 4, the angle between the lenticule 41 and the plane of the screen is $\alpha_1$.

Embodiments of the invention are based on the insight of the inventors that a judicious choice of the angle of the sawtooth pattern yields a very efficient reduction of the undesired reflections, while maintaining very good brightness of the desired image. If a sawtooth pattern is used on the primary screen with white (reflective) segments aimed at the audience and black segments aimed at the secondary screen, there is, at sufficiently small rotation angles $\alpha_1$ (this is the angle of the reflective portion of the sawtooth relative to the main surface of the screen), only a small effect on the luminance of that screen as seen by the audience. The luminance only starts to decrease if the sawtooth angle becomes so big that the individual protrusions obstruct some of the white illuminated areas on the screen.

This can be explained using the assumptions introduced in the mathematical derivation above. For the reflection to the secondary screen, the formula above will change to:

$$F_m \propto \frac{(b \sin \alpha_1 - a \cos \alpha_1) a}{(b^2 + a^2)^2}$$

For any light coming from the secondary screen and hitting the primary screen, it is obvious that the reflection is reduced by the sawtooth because already a large part of the light from this direction will hit the black part of the sawtooth.

Figure 12:
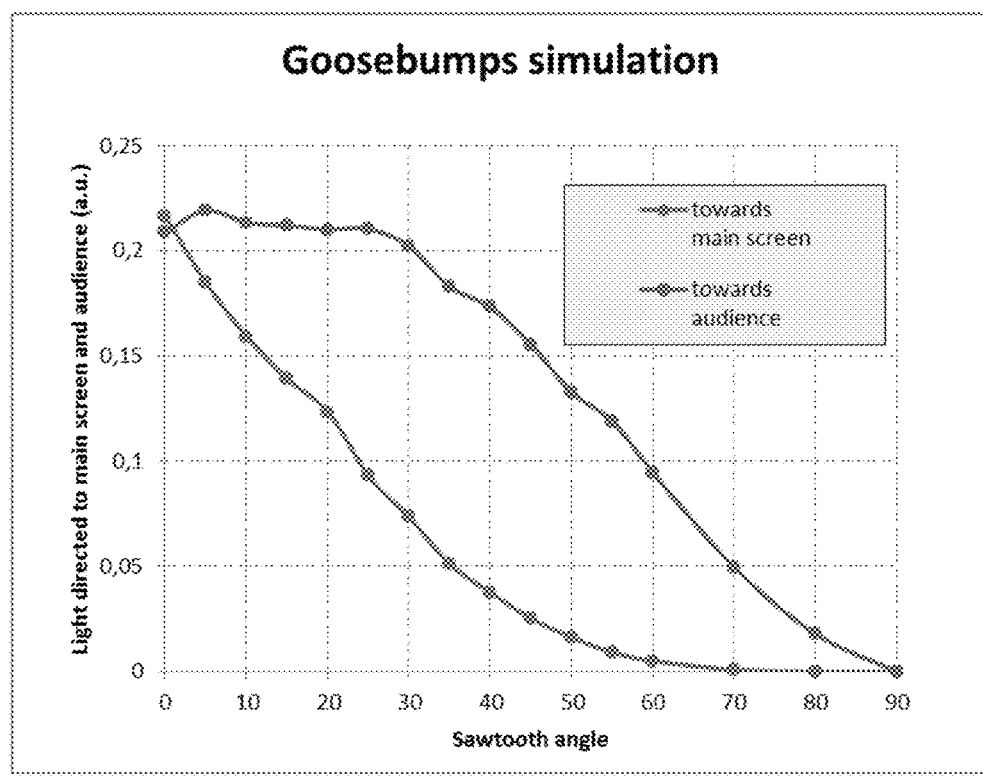
FIG. 12 is a diagram of simulated light reflection in function of the angle of a sawtooth pattern on a screen surface (upper line: "towards audience", lower line: "towards main screen").

A simulation of the total amount of light directed towards the audience and the light directed towards the secondary screen for an illumination of a complete primary screen in this set-up, in function of the sawtooth angle, is shown in FIG. 12. The diagram shows that the reflections towards the secondary screen steeply decrease with an increasing angle of the sawtooth pattern, while the light reflected to the audience remains substantially constant over the entire angular range from 0° to 30°. Based on this analysis, the inventors have arrived at the surprising result that a sawtooth pattern with an angle $\alpha_1$ of up to 30° is highly preferred.

Figure 5:
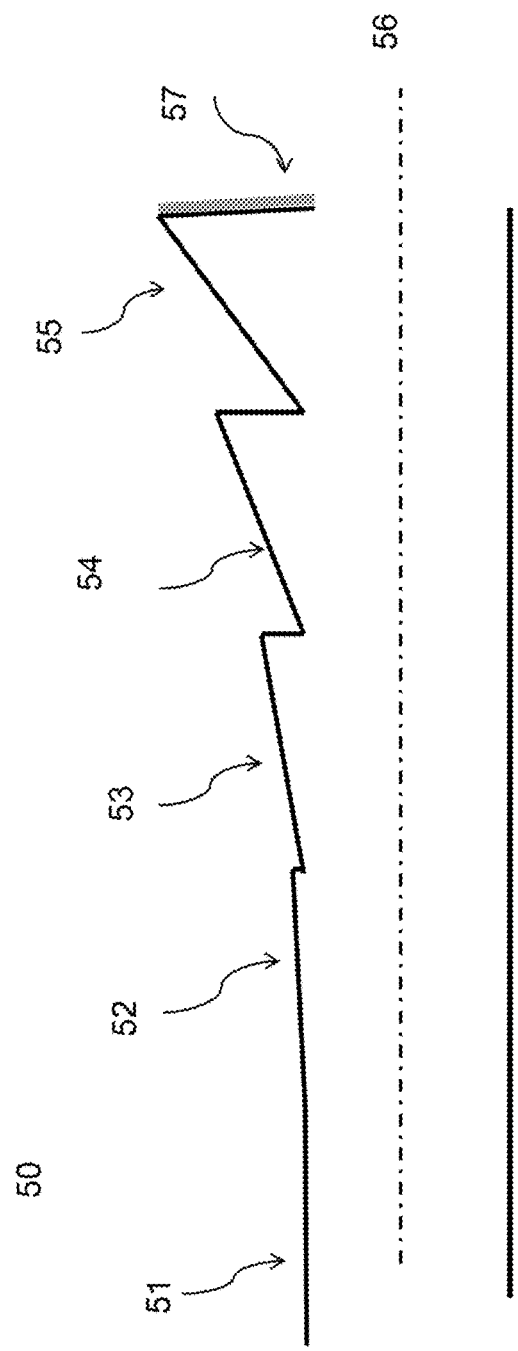
FIG. 5 schematically represents an exemplary screen surface with lenticules.

In particular, in another embodiment, on a lateral screen the angle between a lenticule and the plane of the screen on which the lenticule is formed decreases as the distance between the lenticule and the central screen increases. This is illustrated on FIG. 5. Note that the dimensions of the lenticules may have been exaggerated on FIG. 5. Lenticule 55 is closer to the central screen than lenticule 54 etc. The angle that lenticule 55 makes with the plane 56 of the screen 50 is larger than the angle that lenticule 54 makes with the plane 56 of the screen 50. If a side of a lenticule is likely to reflect light in the direction of another screen of the projection settings, that side may be covered with an antireflection coating 56 like e.g. black paint.

Figure 6:
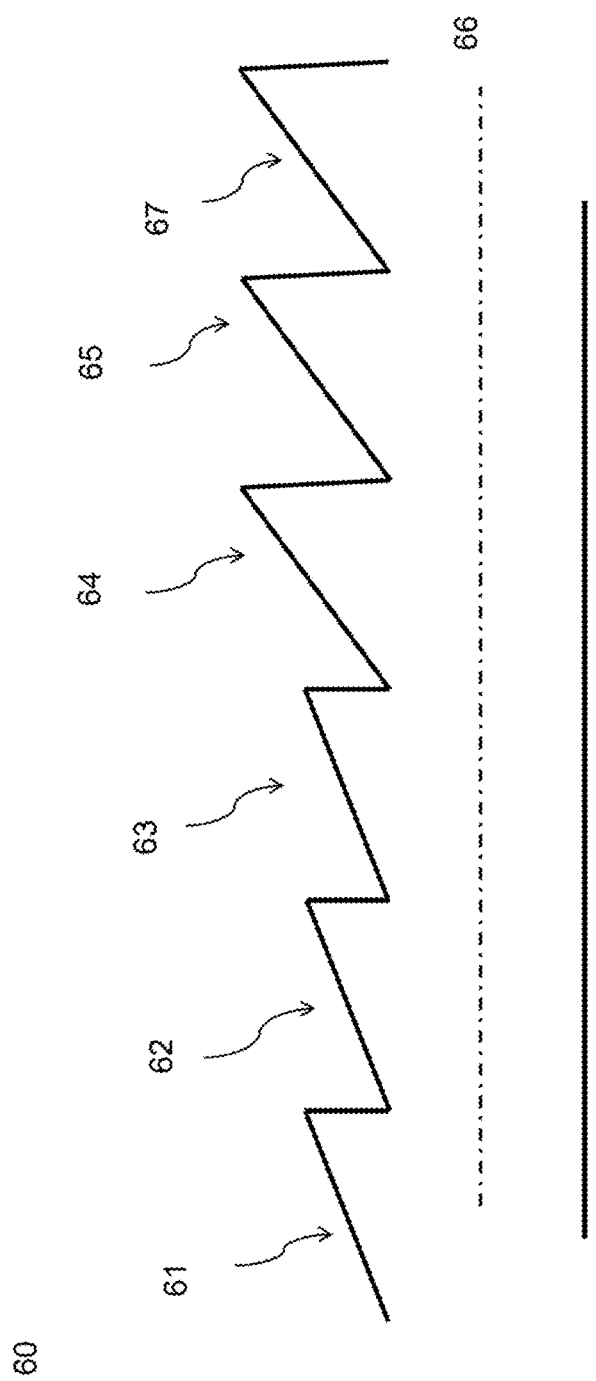
FIG. 6 schematically represents an exemplary screen surface with lenticules, where groups of adjacent lenticules have the same slope.

In another embodiment depicted on FIG. 6, the angle that lenticules on screen 60 make with the plane 66 of the screen 60 will be the same for a group of adjacent lenticules (e.g.

lenticules 65, 64 and 63) and will decrease to a common value for the following group of lenticules (e.g. 62 and 61) on screen 60.

Figure 7:
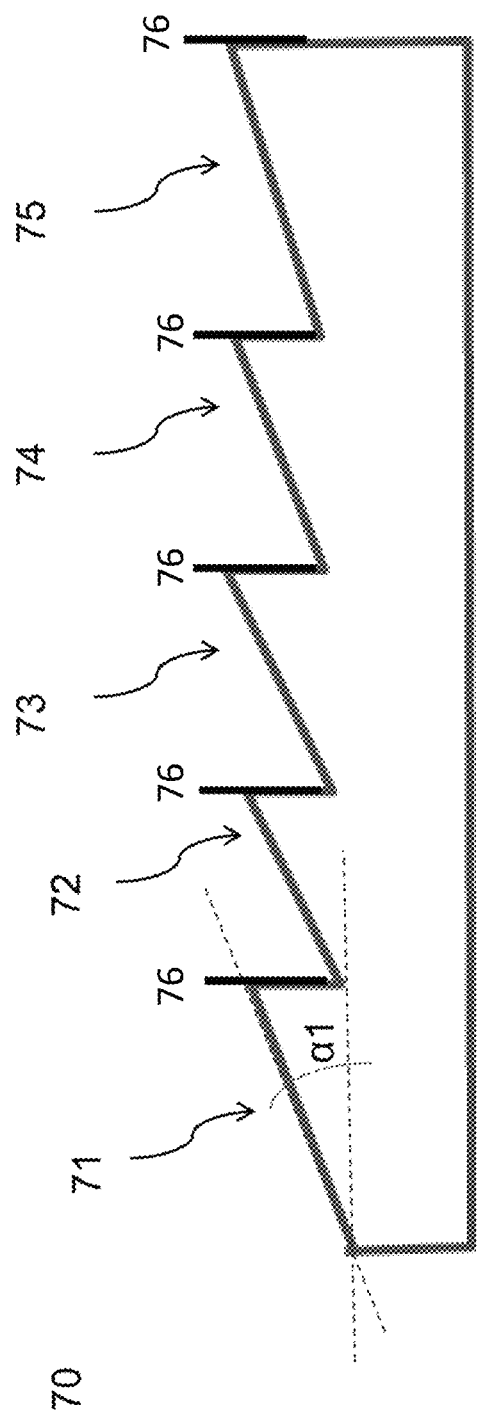
FIG. 7 schematically represents an exemplary screen surface with lenticules having baffles attached to them.

In another embodiment, baffles 76 affixed to at least some of the lenticules will reduce the impact of stray light reflected or received by the screen 70. In FIG. 7, an example of positioning for the baffles 76 is given. The baffle 76 may be made of a light absorbing material or coated with a light absorbing paint on both of their sides. In that case, the baffle 76 will bring the benefit of the antireflection coating 56.

In another embodiment, the lenticules realize a periodic structure on the screen. This periodic structure is meant to reflect the image projected in two or more favored angular ranges. Lenticules are grouped by K where K is the number of favored angular ranges within which the light projected on the screen must be reflected. The groups are repeated on the screen with a periodicity of K lenticules.

Figure 8:
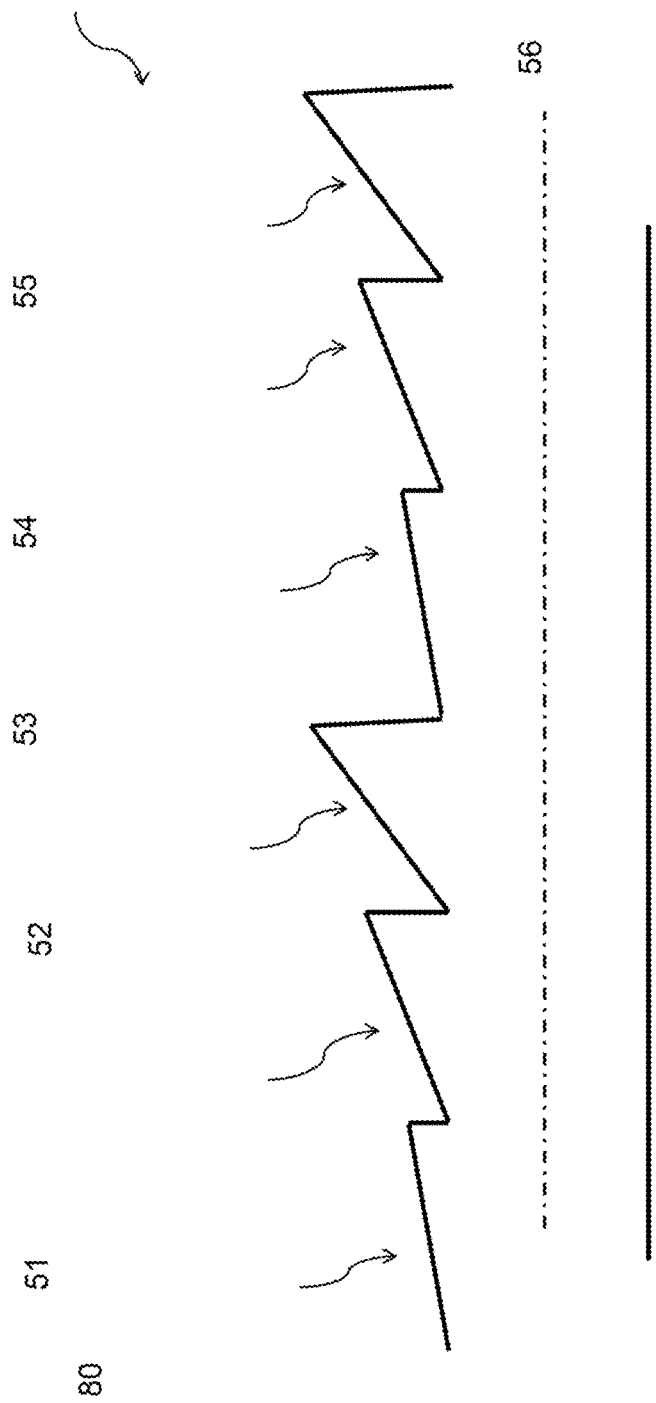
FIG. 8 schematically represents an exemplary screen surface with lenticules, where groups of lenticules reflect light in three different angular ranges.

FIG. 8 shows a section of a screen where K is taken equal to three. Lenticules 81, 82 and 83 form a first group of lenticules that reflect light in three different favored angular ranges. Lenticules 84, 85 and 86 form a second group of lenticules that reflect the light in the same three favored angular ranges. Lenticules 81 and 84 are identical as are lenticules 82 and 85 and 83 and 86 respectively. The group of lenticules is repeated from one end of the screen 80 to another. A screen whose surface would coincide with the general surface 86 of the screen 80 would reflect light differently than screen 80. The period P of the lenticules is advantageously kept at the same order of magnitude as the size of a pixel on the screen. The period P of the lenticules is advantageously taken equal or smaller than the size of a pixel on the screen. In particular, the period P and the size SP of a pixel on the screen are advantageously so that R×P≈SP where R is a natural number.

The lenticules proposed in those embodiments can be engraved in the screen 50. This is particularly the case for a screen 50 made of one or more panels of hardened polymer like e.g. an acrylic resin. The techniques for engraving are similar to those relied on to engrave Fresnel lenses.

The lenticules can also be formed by deposition of a thin film of resin on a screen 50; followed by a molding step where a negative mold is pressed on the deposited resin.

Examples of techniques to realize fine structures by molding are given in e.g. US 2010/0226022 "Fresnel lens, the apparatus and the method of manufacturing thereof".

Structuring the paint spread over a screen is another technique to realize lenticules of varied shapes and forms. The technique can be applied to a wide range of existing walls, making it desirable for retrofitting existing projection settings like theaters and turning them into multi-screen projection settings. The paint can be structured by inkjet printing.

In a first method, the nozzle of the printer is smaller than the smaller feature required in the structured paint layer. The longer the nozzle will spray paint on the same spot, the thicker the layer of paint on that spot. By modulating the speed at which the nozzle is scanned across a screen, it is possible to realize different profile for the lenticules. In a first approximation, the slower the nozzle will scan a first area of the screen, the thicker the layer of paint will be on that area. Conversely, the faster the nozzle will scan a second area of the screen, the thinner the layer of paint will be on that second area.

Figure 9:
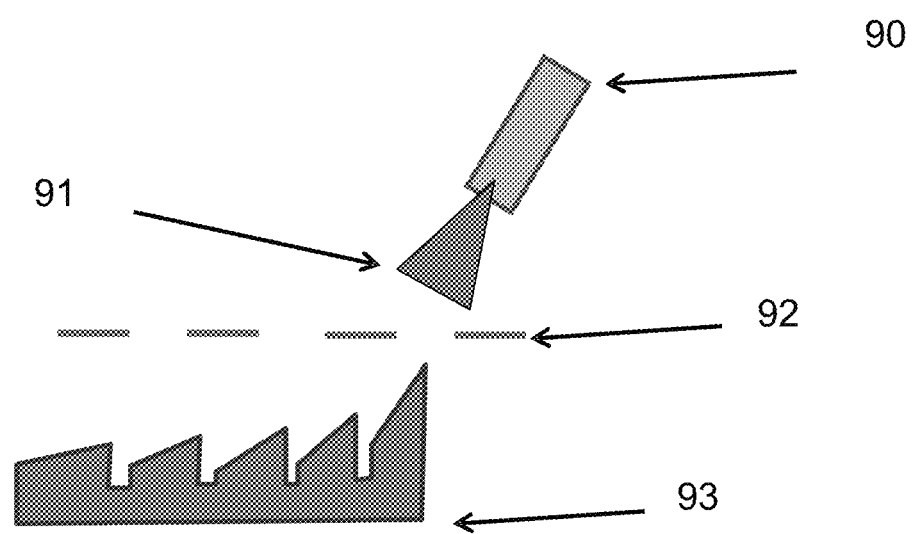
FIG. 9 illustrates a method for structuring paint, wherein a nozzle sprays paint through a mesh placed between the nozzle and the screen being painted.

In a second method for structuring paint, the nozzle 90 will spray paint 91 through a mesh 92 placed between the nozzle and the screen 93 being painted as exemplified on FIG. 9.

The structured paint layer so obtained is best realized with a light absorbing material like black paint. This will help alleviate the glare problem mentioned earlier. The regions of the lenticules that must reflect the light in one or more preferred directions are coated with a light reflective coating. The reflecting coating may for instance be a bright paint and in particular a white paint.

The reflective coating can be deposited with one of the two methods described here above.

To avoid visual artifacts on the screen like e.g. visible stripes, the feature size (e.g. the distance between two lenticules on FIG. 4) should be smaller than the size of the pixels projected on the screen.

The base structure drawn above is best formed using light absorbing material like e.g. dark paint.

An alternative to the lenticules discussed so far are e.g. holographic structures.

The complexity of the lenticules can be increased. For instance, lenticules with a hexagonal section can be used.

FIG. 10A shows a top view of the lenticules and FIG. 10B shows a section of the lenticules along the axis A-B on FIG. 10A. The inner walls of a lenticule can be coated with different coatings, depending on the orientation of the wall. For instance, the walls meant to reflect light towards the audience are coated with a reflective coating 106 while the walls most susceptible to receive light from another screen are coated with a light absorbing material 107.

Some of the area of the bottom of the lenticules can be coated with the reflective coating 106.

The coatings can be a function of the position of the lenticules on a screen and in particular a function of the distance of a lenticules to another screen, in particular the central screen. This is illustrated on FIG. 10B with lenticule 105 is closer to e.g. the central screen than lenticule 101.

In a preferred embodiment, the light absorbing coating is coated on the inner walls of the lenticules that are not visible from a point chosen in the audience (e.g. point P on FIG. 1). The light reflecting coating is applied to the inner walls of the lenticules that are visible from the point P in the audience.

In another preferred embodiment, the light absorbing or antireflection coating is coated on the inner walls of the lenticules that are not visible from a projector e.g. the antireflection coating will be applied to the inner walls of the lenticules on the left projection screen 14 that are not visible from the projector 16B (e.g. the center of the projection lens of projector 16B). The reflective coating will be applied to the inner walls of the lenticules on the left projection screen 14 that are visible from the projector 16B. The reflective and anti-reflective coatings are then similarly applied mutatis mutandis on the inner walls of the lenticules on the right projection screen 12.

A coating can be selectively sprayed on the inner walls of the lenticules by spray painting at an angle, with or without using a grid.

Figure 10:
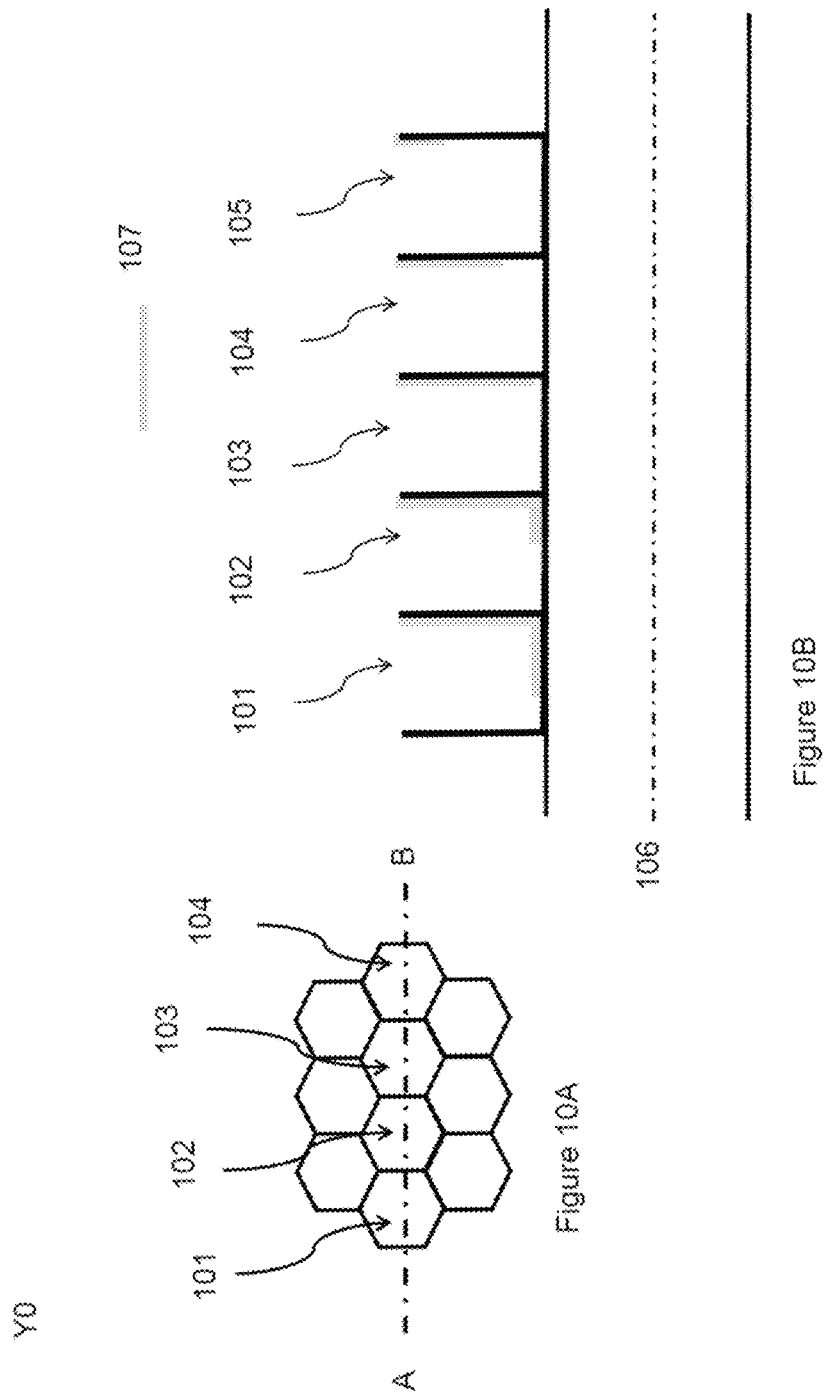
FIG. 10A shows a top view of exemplary lenticules.
FIG. 10B shows a section of the lenticules along the axis A-B indicated on FIG. 10A.

The lenticules on FIG. 10 have a constant hexagonal cross section i.e. the inner walls are perpendicular to the same surface e.g. the general surface of the screen. To avoid restricting the favored angular range within which the screen will reflect the light of the projector too much, the inner walls may be made more diffusive. For instance, the surface of the inner walls is roughened by any practical methods (e.g. by adjusting the viscosity of the paint that is spray painted at an angle on the inner walls of the lenticules).

Figure 11:
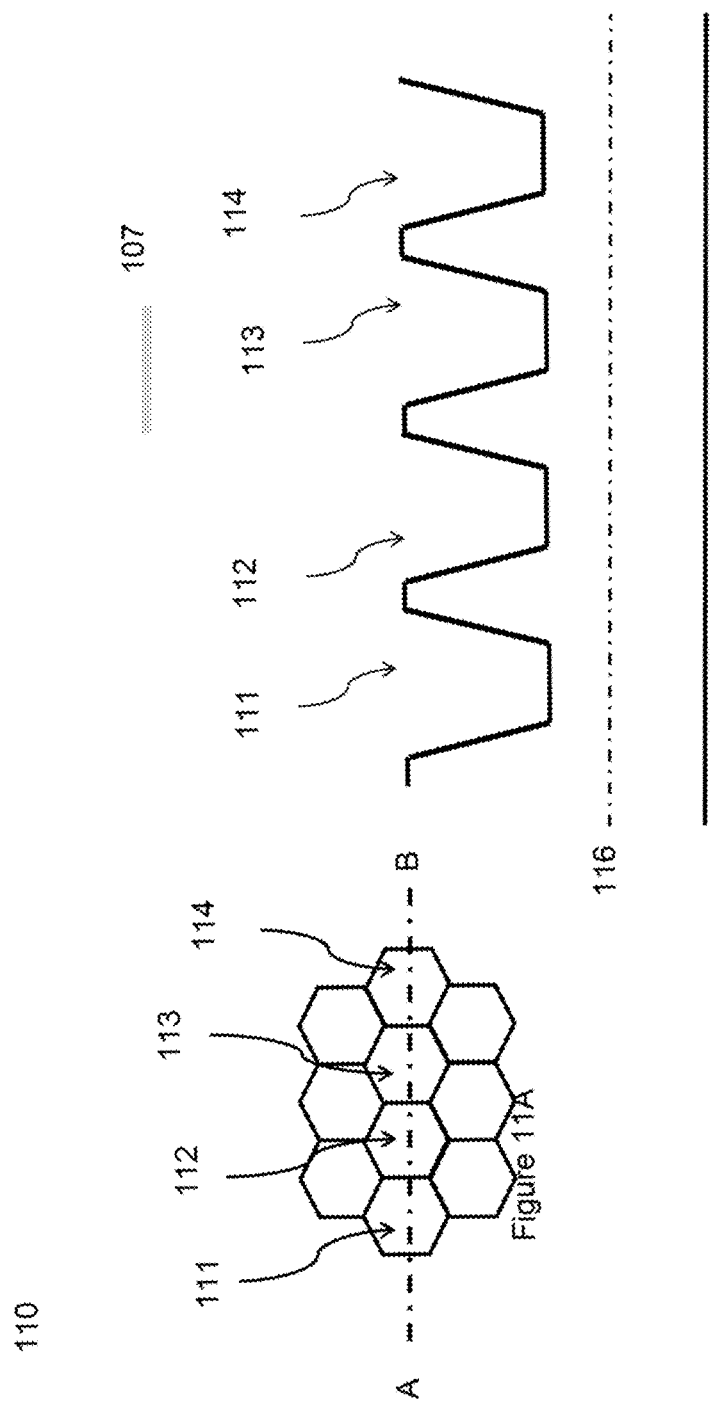
FIG. 11A shows a top view of exemplary lenticules have a varying cross section.
FIG. 11B shows a section of the lenticules along the axis A-B indicated on FIG. 11A.

In another preferred embodiment, the lenticules have a varying cross section. The cross section at the base of the lenticules has a smaller area than the cross section at the top of the lenticules. An example of such lenticules is given on FIG. 11A/B.

The techniques discussed here above will cancel or at least reduce the glare caused by reflection of bright areas on a first screen to a second screen and in particular dark areas of a second screen.

If the glare is not reduced adequately by the techniques proposed here above, it can be further reduced by modulating the brightness of the images projected on a first screen in function of the brightness of the images projected on a second screen.

The brightness of a pixel on the first screen is the sum of two main components. The first component is determined by the light projected on the first screen by the projector aimed at that first screen. The second component is determined by the light reflected on the second screen and impinging on the first screen at the position of the pixel being considered.

A technique is hereby proposed to reduce the glare from a second screen on a first screen.

For any given pixel P on the first screen that must display a target brightness TB, the contribution CG of the glare to pixel P from all the pixels of the second screen is evaluated.

The pixels projected on the first screen are projected with a corrected brightness CB=TB−CG. The resulting brightness of the pixels on the first screen will then be equal to CB+CG=TB−CG+CG=TB and the glare is reduced. It is immediately clear from the formula, that this technique can only be applied to pixels whose target brightness TB is sufficiently high to allow subtraction of the correction value CG. Thus, this method will not be effective when glare is to be removed from an image which is intended to be mostly dark.

The necessary calculations can be performed by a control means, which may be implemented as a dedicated hardware device, configurable hardware logic such as an FPGA, or an appropriately programmed microcontroller or microprocessor. This control means may be a controller incorporated into a projector, and configured to control the brightness of the projector based on the outcome of these calculations. The control means may also be provided as a separate controller module. A computer readable medium storing a program that, when executed, causes a processor to carry out the functions of the control means, and the program or software itself, are also embodiments of the present invention.

To perform the necessary calculations, the control means must have access to the respective CG terms. The control means may receive a copy of the image signal of the second projector via a data communication interface, and apply a pre-programmed model of the glare distribution to this image signal to determine the relevant CG terms for the various pixels.

To reduce the complexity of the calculations, a coarser approach is possible. The second contribution CG is not computed for every pixel on the first screen but e.g. for a group of pixels (e.g. a square of 100 pixels by 100 pixels). The complexity can further be reduced by calculating the contribution CG based on an average brightness of clusters of pixels on the second screen and evaluating the contribution to the glare of all these clusters to the clusters of pixels on the first screen. The clusters of pixels have fewer pixels than the complete images projected on the respective screens.

Even with the above simplifications, the number of computations required to apply the glare cancelling technique may be prohibitive for a real-time implementation on a given hardware platform. In a variant of the technique, the necessary calculations are performed in advance, and correction information is encoded as metadata in the video stream that is supplied to the projectors. This correction information may pertain to the entire video program, or it may be limited to any number of specific occurrences of bright images that are expected or known to cause disturbing visual artefacts if they are not corrected for.

While the invention is susceptible to various modifications and alternative forms, specific examples will be shown in the drawings and described in detail. It should be understood, however, that the invention is not limited to the particular forms or methods disclosed. Rather, the invention is intended to cover all modifications, equivalents and alternatives falling within the scope of the claims.

The invention claimed is:

1. A projection assembly comprising at least a first screen and a second screen; wherein the first screen is at an angle with the second screen; and wherein the first screen is adapted to reflect light projected onto it predominantly or exclusively in one or more angular ranges that do not intersect with the second screen;

the projection assembly further comprising:
   a first projector arranged to project first images on the first screen and a second projector arranged to project second images on the second screen; and
   control means configured to control the first projector in such a way that the brightness of the image projected on the first screen is a function of the brightness of the image projected on the second screen;
   wherein the control means is configured to receive a copy of the image signal of the second projector via a data communication interface, and to apply a pre-programmed model of a glare distribution to said image signal in order to determine a contribution of the image projected on the second screen to the glare at each pixel of the image projected on the first screen.

2. A projection assembly according to claim 1, wherein the first screen is a lenticular screen.

3. A projection assembly according to claim 1, wherein the thickness of the first screen is not constant in at least one direction across the screen.

4. A projection assembly according to claim 3, wherein the thickness of the first screen varies in a sawtooth fashion in at least one direction across the screen.

5. A projection assembly according to claim 4, wherein a second plurality of sections of said sawtooth pattern are rotated towards said second screen, said second plurality of sections having a surface with reduced reflectivity.

6. A projection assembly according to claim 3, wherein the thickness of the first screen varies periodically.

7. A projection assembly according to claim 1, wherein the control means is configured to control the first projector in such a way that the brightness of at least a part of the image projected on the first screen is a function of the brightness of at least a part of the image projected on the second screen.

8. A projection assembly according to claim 1, wherein the control means is configured to control the first projector in such a way that the brightness of at least one pixel of the image projected on the first screen is a function of the brightness of at least one pixel of the image projected on the second screen.

9. A projection assembly according to claim 1, wherein the control means is configured to control the first projector in such a way that the brightness of at least one pixel of the image projected on the first screen is a function of the brightness of a cluster of pixels of the image projected on the second screen, the cluster of pixels having fewer pixels than the number of pixels projected on the second screen.

10. A projection assembly according to claim 1, wherein the control means is configured to control the first projector in such a way that the brightness of at least one cluster of pixels of the image projected on the first screen is a function of the brightness of a cluster of pixels of the image projected on the second screen, the cluster of pixels on the first screen having fewer pixels than the number of pixels projected on the first screen.

11. A method for projecting images with a projection assembly according to claim 1, the method comprising projecting a first image with the first projector on the first screen, and projecting a second image with the second projector on the second screen, and adjusting the brightness of the first image in function of the brightness of the second image;
further comprising applying a pre-programmed model of a glare distribution to an image signal of the second projector in order to determine a contribution of the image projected on the second screen to the glare at each pixel of the image projected on the first screen.

12. The method according to claim 11, further comprising adjusting the brightness of at least a part of the first image in function of the brightness of at least a part of the second image.

13. The method according to claim 11, further comprising adjusting the brightness of at least one pixel of the first image in function of the brightness of at least one pixel of the second image.

14. The method according to claim 11, further comprising adjusting the brightness of at least one pixel of the first image in function of the brightness of a cluster of pixels of the second image, the cluster of pixels having fewer pixels than the number of pixels in the second image.

15. The method according to claim 11, further comprising adjusting the brightness of at least one cluster of pixels of the first image in function of the brightness of a cluster of pixels of the second image, the cluster of pixels of the first image having fewer pixels than the number of pixels in the first image.

16. A controller configured for use as the control means of claim 1.

17. A computer program product comprising code means configured to cause a processor to carry out the function of the control means of claim 1.

* * * * *